May 22, 1962 J. W. WIGERT 3,035,419
COOLING DEVICE
Filed Jan. 23, 1961 2 Sheets-Sheet 1

WITNESSES:
Bernard R. Gieguey
L. E. Hesseman

INVENTOR
John W. Wigert
BY
D. D. Smith
ATTORNEY

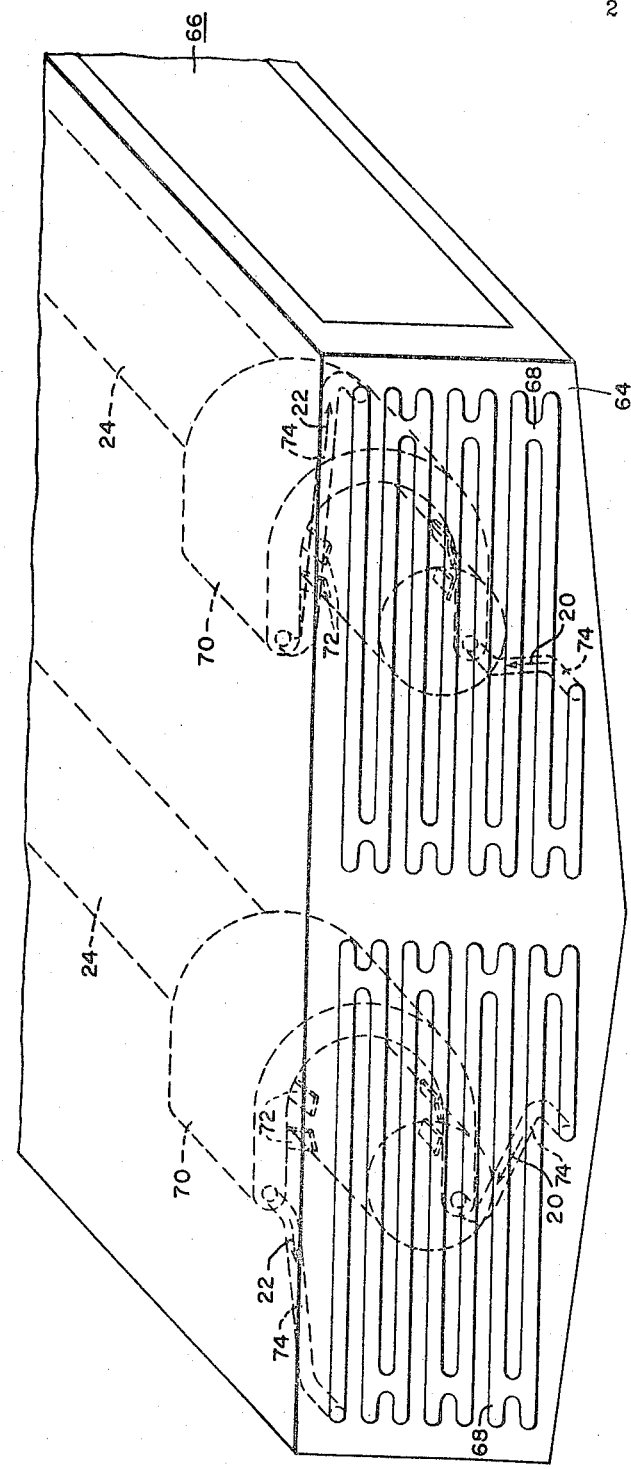

3,035,419
Patented May 22, 1962

3,035,419
COOLING DEVICE
John W. Wigert, Berea, Ohio, assignor to Westinghouse Electric Corporation, East Pittsburgh, Pa., a corporation of Pennsylvania
Filed Jan. 23, 1961, Ser. No. 84,018
17 Claims. (Cl. 62—259)

This invention relates generally to a closed refrigeration system for spot cooling a radiation discharge device such as a vapor type lamp, and relates more particularly to an arrangement of an evaporator and a condenser whereby the evaporator engages a portion of the device and the condenser is exposed to the air outside of a fixture containing the device so that the device can be cooled to increase the operating efficiency thereof. In this arrangement, the system is filled with a refrigerant and no external power source is required for its operation.

The light output of today's high output fluorescent lamps is adversely influenced by high operating ambient temperatures. Consequently, the avoidance of attendant decreases in efficiency necessitates measures to keep the bulb wall or envelope of the lamps within said certain specified temperature limits. This is particularly true for fluorescent lamps contained in relatively completely sealed or non-ventilated fixtures. It has been established that when the ambient temperature of a fluorescent lamp rises the mercury-vapor pressure in that lamp builds up to a point where it can substantially reduce the lumen output of the lamp. In order to decrease the operating mercury-vapor pressure within the so-called higher-loaded lamps, and thereby at least approach a maximum of efficiency in generating ultraviolet radiations, it has been necessary to cool a portion of the lamp envelope to a temperature of about 40° C. to 45° C., since the coolest portion of the envelope determines the equilibrium pressure of the mercury vapor contained within the envelope. With auxiliary cooling means, fluorescent type lamps can be operated with a much lower power input and still maintain good efficiency in generating ultraviolet radiations.

The increase in light output from systems employing the principles of this invention can be substantial and, depending on the particular type of the system used, can easily provide an increase in lumen output in a range of 20% to 5%.

Accordingly, one of the objects of this invention is to provide a novel and effective system for spot cooling of vapor lamps to produce a higher lumen output for a given power input.

Another object of the invention is the provision of a spot-cooling system having the characters described and requiring a minimum of component parts.

A further object of this invention is to provide a totally enclosed cooling system consisting of an evaporator and a condenser, the system being partially filled with a refrigerant under pressure.

A still further object of the invention is to provide an effective spot cooling device having no moving mechanical parts so that it is relatively inexpensive while highly efficient in operation.

Another object of this invention is to provide an evaporator for a spot cooling device having heat conducting contact means for engaging an envelope of a vapor type lamp.

A further object of this invention is to provide a cooling device for a vapor type lamp having the evaporator or the condenser, or both, formed of a spiralled coil of tubing.

A still further object of this invention is the incorporation of a conductive material between at least a portion of an evaporator of a cooling device and a vapor type lamp so that the evaporator can serve as an effective heat conductor for cooling the lamp.

Another object of this invention is to provide a novel condenser element for a spot cooling device taking the shape of an efficient heat sink to provide as much exposed area as possible and still be consistent with design considerations.

Still another object of this invention is to provide a cooling device adapted for a vapor lamp and constructed as a leak tight system so as to function properly under a wide variety of conditions.

A still further object of this invention comprehends the use of a single condenser in conjunction with a plurality of evaporators so that the cooling system of this invention can cool a plurality of lamps simultaneously and yet avoid expensive duplication of parts.

Still another object of the present invention is the incorporation of a condenser portion of a spot cooling device in an element of a fixture to present an efficient as well as an attractive organization.

These and other objects of this invention will become more apparent upon consideration of the following detailed description of a spot cooling device for a vapor type lamp incorporating various components and structures in accordance with the principles of this invention when taken in connection with the following drawings, in which:

FIG. 7 is a partial isometric view of an end of a lighting fixture incorporating a condenser therein.

In accordance generally with the principles of the present invention and the attainment of the foregoing objects there is provided in cooperative combination with a radiation discharge device, such as a fluorescent lamp, a cooling device which employs an evaporator, condenser and connections therebetween forming a sealed flow path for a refrigerant for maintaining an area on the exterior surface of the radiation device at a desired low temperature. The principles of this invention further contemplates that one condenser can be arranged to serve two or more lamps or that a condenser can be formed integral with part of a lighting fixture, such as an end plate, if desired.

Figure 1:
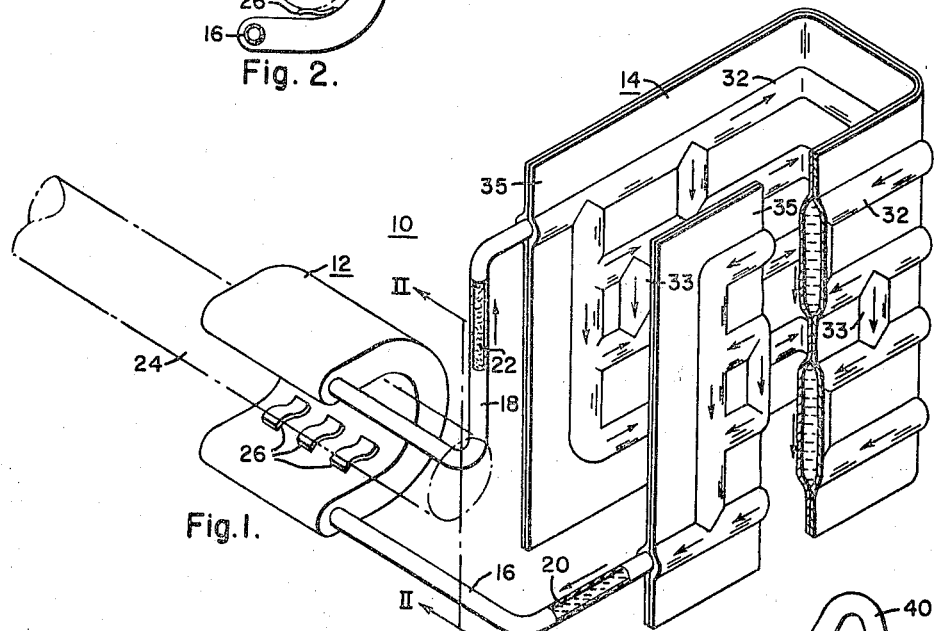
FIG. 1 is an isometric view of a cooling device made in accordance with the principles of this invention with portions broken away and other portions sectioned to illustrate the function thereof.

Referring more particularly to FIG. 1, there is shown a refrigeration cooling device 10 having an evaporator 12 and a condenser 14 which are connected together by lower tube 16 and upper 18. The evaporator 12 and condenser 14 are substantially hollow inside so that there is presented in connection with the conduit tubular sections 16 and 18 a totally enclosed vapor tight system being partially filled with a refrigerant which when in operation is in a liquid form in the lower section thereof, as shown at 20, and is in a gaseous form in the upper section thereof, as shown at 22, with the direction of flow being as indicated by the arrows.

Figure 2:
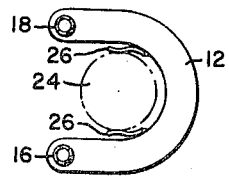
FIG. 2 is a sectional view of the cooling device of FIG. 1, the section being taken generally along the reference line II—II thereof.

The evaporator 12 is of a hollow C configuration so as to provide it with a reservoir for an amount of refrigerant sufficient to provide the device 10 with enough thermal capacity to fulfill its requirements. The contacting spring fingers 26, as seen in FIGS. 1 and 2, are resilient in character and are located on the inner surface of the evaporator 12. A fluorescent or other elongated vapor-type lamp 24 is easily inserted into the open side of the evaporator 12, this also permitting ready interchanging of lamps when necessary, and is securely held in contact therewith by the force of fingers 26 engaging the bulb wall or envelope of the lamp. The evaporator 12 is designed so that the fingers 26 hold the lamp 24 in suspension without its contacting the center of the C because the rates of cooling between the wall of the evaporator and the fingers are differing and it is desirable to prevent uneven rates of cooling on different areas, or spots, of the bulb wall. In addition, only the coolest portion of the lamp envelope is functionally significant.

The fingers 26 are made of material that has good thermal conduction, such as copper or aluminum, so as effectively to conduct heat from the lamp 24 to the evaporator 12. The heat thus absorbed by the evaporator causes the liquid refrigerant 20 therein to boil and evaporate as a vapor or gaseous refrigerant 22. The collection of the vapor in the evaporator causes it to flow through the upper tubular section 18 and through the condenser 14 where the vapor 22 is changed back to the liquid 20. The pressure of the vapor forces the liquid 20 out of the condenser 14, through the lower tubular section 16, and back to the evaporator 12 where it again absorbs heat from the lamp and vaporizes to complete the cycle through the flow path thus formed.

Figure 3:
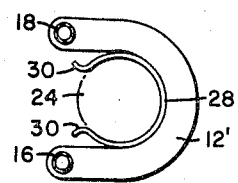
FIG. 3 is a view of a modified form of the evaporator as shown in FIG. 1 and is comparable to the section shown in FIG. 2.

An arrangement employing a C-shaped evaporator that permits the lamp 24 to rest against the central portion of the C, and to provide thereby an increased cooled area on the lamp envelope, is illustrated in FIG. 3 as the evaporator 12'. In place of fingers, the evaporator 12' includes a pant leg type clip of thermal conducting element 28 which has a C-configuration generally conforming to the inner surface of the evaporator 12'. The conducting element 28 includes resilient rounded and divergent ends 30 for guiding the bulb wall of the lamp into the C and securely holding it within the confines of the inner surface of the element 28 which substantially conforms, at least partially, to the circumference of the lamp 24. In this way a uniform spot-cooling of a substantial circumference of the lamp 24 can be obtained. In all other respects the evaporator 12' of FIG. 3 is similar to the evaporator 12 of FIG. 2 and like reference numerals have been employed to indicate like portions thereof.

As explaind above, the evaporator 12 of FIG. 2 includes a plurality of individual fingers above and below a lamp while the evaporator 12' includes a single elongated and integral conducting element 28. It is of course understood that the upper or lower fingers 26, or both, could be single integral pieces rather than a plurality of individual fingers. Likewise, it is to be understood that the integral conducting element 28 could be instead a plurality of separate but generally parallel clip-like elements if desired. The particular modifications shown in FIGURES 2 and 3 are merely preferred forms of the invention.

Condenser 14 of FIG. 1 is shown as being generally U-shaped. This particular shape is chosen as a matter of convenience and it is understood that many other shapes are possible some of which will be explained hereinafter. The condenser 14 has tubular sections or channels 32 and 33 extending generally throughout its inner surface so as to provide a large area for containing the refrigerant during its condensation from a gaseous form 22 to a liquid form 20. This is effected by the cooler ambient air surrounding the condenser 14 which serves to remove heat from the tubular sections 32 and 33 to cool the refrigerant. The condenser 14 is preferably made of any material having a high thermal conductivity characteristic such as copper or aluminum, or an alloy of either. This condenser is designed to be placed outside of a fixture (not shown in FIG. 1) containing the fluorescent lamp 24 so as to be subject to the relatively cooler ambient air outside of that fixture. The particular configuration of the condenser 14 or its tubular sections 32 and 33 can be varied as desired, provided the flow of refrigerant is not impeded, depending on the appearance and effectiveness requirements presented in a given situation. The reason for the staggered relationship of the tubular sections 33 as shown in FIG. 1 is to slow down the flow of the refrigerant through the condenser so that more complete condensation of the vapor 22 can occur.

The totally enclosed refrigerating system of this invention, as shown in FIG. 1 for example, serves to cool the lamp 24 when it is placed within the spring contacts 26 or 28 as explained previously. As the refrigerant changes from its liquid form 20 to its gaseous form 22, heat from the lamp 24 is absorbed in great quantity. Then the refrigerant in its gaseous form 22 passes into the condenser 14 with a resulting loss of heat occurring due to the cooling effect thereof. The condenser 14, by giving off heat through its tubular sections or passages 32, 33 and its peripheral edges 35 which serve as radiating fins condenses the refrigerant into liquid droplets 20 which then coalesce and flow by gravity to the bottom of the condenser 14. Thence the liquid 20 flows back to the evaporator 12 through the tube 16 to repeat its cooling cycle as clearly shown by the flow arrows of FIG. 1.

It is important that the refrigerant have a boiling point within the desired range as well as a heat of vaporization value that will efficiently serve the purpose required. A material having such characteristics is trichloromonofluoromethane ($CCl_3F$). Of course, other materials with similar qualifications will be equally adaptable. The closed system of this invention will operate at rather low pressures and the boiling point varies, of course, with changes in pressure.

Figure 4:
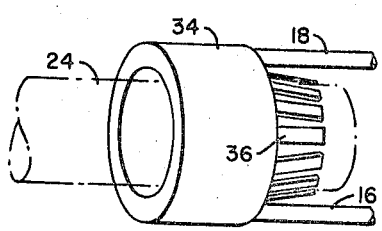
FIG. 4 illustrates an isometric view of another evaporator of a spot cooling device made in accordance with the principles of the present invention.

Another form for the evaporator portion of the spot cooling arrangement, constructed in accordance with the principles of this invention, is shown in FIG. 4 as a hollow cylindrical sleeve 34 which has contacting resilient spring fingers 36 formed from a thermally conductive material and attached to the inner periphery thereof to contact the bulb wall of the fluorescent lamp 24. In furtherance of the cooling function at least the inner periphery of the sleeve 34 is fabricated from a thermally conductive material to which the fingers 34 are joined in a heat transforming relation. The connecting conduits 16 and 18 are adapted to be coupled to a condenser such as the condenser 14 shown in FIG. 1, or its equivalent.

Figure 5:
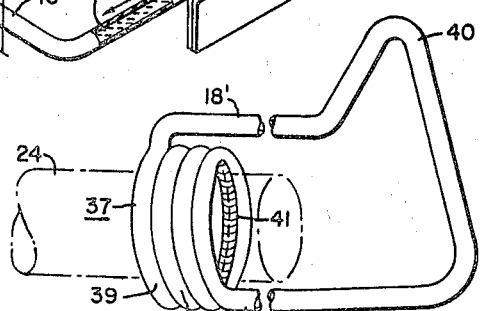
FIG. 5 is an isometric view of another form of the spot cooling device made in accordance with the principles of the present invention.

The cooling device 37, as shown in FIG. 5, comprises a continuous piece of copper tubing 38 coiled so as to form a sleeve portion 39 for the evaporator and an outwardly extending section 40 which serves as a condenser. The coiled sleeve portion 39 is adapted to receive, by a relatively close fit, a fluorescent type lamp 24. Although it would appear that the refrigerant level in such an evaporator, when employed in the usual horizontal position, would not extend to the tops of the individual turns of the coil surrounding the lamp and therefore would form an interrupting space at that point containing either partial vacuum or the refrigerant in its vapor state, nevertheless this invention has been experimentally proved to be effective.

The evaporator portion 39, condenser portion 40, and connecting tubular portions 16' and 18' can all be made from one continuous unbroken tubing 38 if desired. Such a construction guarantees a leak-proof system because no connecting joints are necessary other than, of course, the initial joining of the two ends of the tubing after it is formed into a tubular section. However, if desired, either the evaporator portion 39 or the condenser portion 40 can be used separately with other types of condensers or evaporators, respectively.

Because of the extreme ease in manufacture of the cooling device 37 any slight inefficiency because of some of the liquid failing to evaporate, thus failing to give off somewhat less heat in the condensing portion 40, is quite tolerable and can be economically advantageous. A conducting material 41, such as an aluminum paste filler or its equivalent, is preferably placed within the grooves formed by adjacent coils of the tubing 38 so as to give in effect a continuous surface adapted to contact the bulb wall of the vapor lamp 24. Of course, it is understood that similar conducting material can also be used with other types of evaporators to increase heat transfer. The material of the tubing 38 is preferably constructed of high thermal conductive metals such as a copper or aluminum alloy, or the like.

Figure 6:
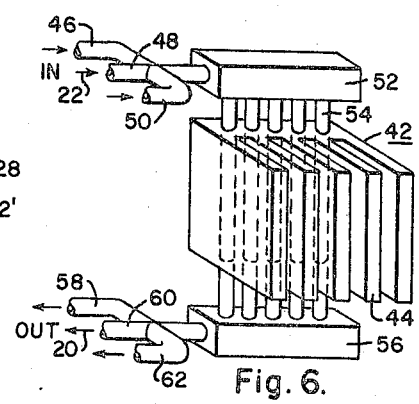
FIG. 6 is an isometric view of another form of a condenser for a spot cooling device made in accordance with the principles of the present invention.

Another configuration for a condensing portion of a spot cooling device constructed in accordance with the principles of this invention is shown in FIG. 6. However, even though this condenser could be used for a single evaporator, the modification shown is a condenser 42 which is adapted to accommodate a plurality of evaporators (not shown). Although varying numbers of evaporators can be operated in conjunction with a single condenser, the embodiment shown in FIG. 6 is, for illustrative purposes, specifically designed for three evaporators, with each evaporator serving to spot cool a single lamp. The vapor generated in each of the evaporators enters the condenser 42 through each of the "In" tubular portions 46, 48 and 50, respectively. From these "In" tubular portions, the vapor collects in an upper receptacle 52 until the built-up vapor pressure causes it to move downwardly through the hollow members 54. The members 54 are made of a highly thermally conductive material so as to readily transmit heat to the radiator 44, which in turn dissipates the heat to the ambient air through its body portion and fins by means of convection or direct radiation as the case may be. In furtherance of this purpose the hollow members 54 are embedded in or otherwise disposed in heat transfer relation with the radiator 44. As heat is absorbed from the hollow members 54, the refrigerant condenses into its liquid form 20 and drops to a lower receptacle 56 where it collects and, due to the aforesaid pressure rise within the system, passes out of the condenser into each of the three evaporators through the "Out" tubular portions 58, 60 and 62, respectively, so as to complete the cycle.

If desired, the condenser, instead of being a part separate from the lighting fixture containing the lamps, can be formed integrally with a part of the lighting fixture itself as illustrated, for example, in FIG. 7. In this instance, a portion of the lighting fixture housing 66, for example the end plate or wall 64 forms the heat dissipating condenser and includes a closed system of tubular sections or channels 68 similar to the tubular sections 32 and 33 shown in FIG. 1. As here shown, a separate system of channels 68 is used for each evaporator 70 but it is to be understood that a single system of channels 68 can be employed for both evaporators if desired following the principles of the present invention as shown in FIG. 6. In operation, the contact fingers 72 transmit heat to the evaporators 70 which in turn, through a refrigerant passing from the evaporators 70 and the interconnecting conduits 74 into the channels 68, permits absorption thereof by the end plate 64. The vapor 22 passes into the channels 68 whereby the surfaces of the channels and the rest of the end plate 64, which serves as a radiator, dissipates the heat to the ambient air so as to change the vapor 22 to a liquid 20 which passes back to the evaporators 70 for recycling. It is to be noted that parts other than the end plates of a lighting fixture can be so used as a condenser, if desired.

The system as described above presents a spot cooling device for fluorescent or other vapor-type lamps to increase the efficiency of the lamps. It is a self-contained unit requiring no external source of power. It should have an indefinite life disregarding unexpected damage which might cause leakage. The construction is not complex and there are but a few parts, none of which are mechanically movable.

One of the outstanding advantages of the spot cooling device of this invention is the self-equalizing feature of the system. That is, when the lamp temperature is low due to a low ambient temperature, the device does not function until the temperature of the lamp has reached a proper temperature to cause the refrigerant to boil. Then, as the temperature increases, the boiling becomes more vigorous causing increased cooling. Thus, it can be seen that a relatively non-complex and inexpensive device has been comprehended by this invention which has the advantage of a unit which turns itself on and off as needed and which is most effective when it is needed the most. When the temperature surrounding the lamp decreases, the refrigerant in the system slows down and even ceases to operate so as to provide a more uniform operation over a greater proportion of the fixture operating temperature range. Although spot cooling is generally most effective near the end of the bulb adjacent the electrodes, the spot cooling can also be quite effective generally anywhere along the surface of the bulb wall.

Since it is obvious that the invention as disclosed herein can be embodied in other forms and constructions within the spirit and scope of the invention, as apparent to one skilled in the art, it is to be understood that the particular embodiments shown herein are but a few of such forms and with various modifications and changes being possible, the invention is not limited in any way with respect thereto. Moreover, it is to be understood that certain features of the invention can be employed without a corresponding use of other features thereof.

Accordingly, what is claimed as new is:

1. A device for cooling a vapor-type lamp comprising, an evaporator having a substantially hollow interior, means secured to said evaporator for thermally engaging the bulb wall of said lamp and for securing said evaporator to said lamp, connecting tubes each having one end thereof joined to said evaporator and communicating at different levels with the hollow interior thereof, a condenser having a substantially hollow interior, said connecting tubes each having the other end thereof engaged with the hollow interior of said condenser but at different levels thereof, a refrigerant capable of existing in gaseous and liquid forms, said refrigerant being located in the hollow portions of said device so as to transfer heat absorbed from the bulb wall to the condenser for dissipation.

2. In a device for cooling a vapor-type lamp having an outer envelope, a hollow heat conducting evaporator having a cross-sectional configuration at least partially conforming to that of said envelope, heat conducting means on said evaporator for engaging a part of said envelope, and conduit means having ends attached to said evaporator in communication with the hollow portion thereof, said conduit means including a portion adapted to extend to an area of lower ambient temperature so that a refrigerant contained within said device can be cooled.

3. In a device for cooling a vapor-type lamp having an outer envelope, a hollow heat conducting evaporator having a cross-sectional configuration at least partially conforming to that of said envelope, resilient spring fingers on said evaporator for thermally and securingly engaging a part of said envelope, and conduit means having ends attached to said evaporator in communication with the hollow portion thereof, said conduit means including a portion adapted to extend to an area of lower ambient temperature so that refrigerant contained within said device can be cooled.

4. In combination, a spot cooling device and a vapor type lamp having an outer envelope, said device comprising a hollow evaporator, heat conducting means on said evaporator engaging a part of said envelope, conduit members having ends attached to said evaporator in communication with the hollow portion thereof, hollow heat dissipating means, the other ends of said conduit members attached to said heat dissipating means in communication with the hollow portion thereof, and a refrigerant contained under pressure within said device so that when said heat dissipating means is located in an area of lower ambient temperature than that around said lamp the refrigerant transfers heat absorbed from said envelope to said heat dissipating means.

5. In a device for cooling an elongated vapor-type lamp, an evaporator comprising a generally C-shaped hollow body portion which generally conforms to at least a portion of the cross-sectional configuration of said lamp, resilient heat-conducting means located on the inner surface of said body portion for releasably engaging said lamp, and conduit means having ends attached to said evaporator in communication with the hollow portion thereof, said conduit means including an intermediate portion extending to an area of lower ambient temperature so that a flow path for a refrigerant contained within said device can be maintained.

6. In a device for cooling a vapor-type lamp, a hollow evaporator having a generally C-shaped cross-sectional configuration which generally conforms to at least a part of the cross-sectional configuration of said lamp, at least one generally C-shaped heat conducting contacting element located on the inner surface of said body portion for releasably engaging said lamp, said contacting element including resilient ends which firmly hold said lamp within the confines of said element and said evaporator, and conduit means having ends attached to said evaporator in communication with the hollow portion thereof, said conduit means including an intermediate portion extending to an area of lower ambient temperature so that a flow path for a refrigerant contained within said device can be maintained.

7. In a device for cooling a vapor-type lamp, a hollow evaporator having a generally annular-shaped cross-sectional configuration which generally conforms to the cross-sectional configuration of said lamp and being of a size to be fitted therearound, heat conducting resilient spring-like means located on said evaporator for engaging said lamp, and means for securing tubular sections to said evaporator in communication with the hollow part thereof, said tubular sections including an intermediate portion extending to an area of lower ambient temperature so that a flow path for a refrigerant contained within said device can be maintained.

8. The combination of an evaporator and a vapor-type lamp having an elongated envelope, said evaporator comprising a spiralled tubing forming a sleeve portion which generally conforming to the cross-sectional configuration of said envelope, said sleeve portion fitting closely around the circumference of said configuration and engaging said envelope, a thermal conducting filler located between the turns of said sleeve portion and contacting said envelope to aid heat transfer to said evaporator, said tubing at least partially providing a flow path for a refrigerant contained in said evaporator.

9. In a device for cooling a vapor-type lamp having an elongated envelope, an evaporator comprising a spiralled tubing forming a sleeve portion which generally conforms to the cross-sectional configuration of said envelope, said sleeve portion being of a size to fit closely around the circumference of said configuration and to engage said envelope, a thermal conducting filler included in the grooves between adjacent coils of the spiralled tubing to provide a substantially continuous contacting and conductive inner surface for said evaporator, said tubing including a portion extending to an area of lower ambient temperature providing a flow path for a refrigerant contained in said device.

10. The combination comprising cooling apparatus and a radiation discharge device having an elongated envelope, said apparatus including a continuous length of thermal conductive tubing, said tubing at one end thereof being coiled so as to form a sleeve portion generally conforming to the cross-sectional configuration of said envelope and being of a size closely engaging said envelope, a thermal conducting filler material located between at least a portion of said envelope and said tubular sleeve, said tubing at the opposite end thereof forming a heat dissipating condenser means for location in an area of lower ambient temperature, said sleeve portion and said condenser means forming a continuous sealed flow path, and a refrigerant included in said flow path so that heat removed from said envelope by said sleeve portion can be carried by said refrigerant to said condenser means for dissipation therefrom.

11. In a device for cooling a vapor-type lamp, a condenser comprising a heat conducting body portion having a plurality of substantially parallel passages therein and a number of channels disposed in a staggered array and interconnecting adjacent pairs of said passages, said passages having openings therein at differing levels, means for securing tubular connecting members to said openings so as to provide at least partially a flow path for a refrigerant contained in said device, said condenser serving to dissipate heat collected by said refrigerant from said lamp.

12. Apparatus for spot cooling a vapor-type radiation device, said apparatus comprising a hollow evaporator, means for absorbing heat from the surface of said device, said evaporator means including openings at different levels thereof, a generally channel-shaped condenser having a plurality of substantially parallel passages therein and a number of tubular sections disposed in a staggered array and interconnecting adjacent pairs of said passages, said condenser including openings in its surface communicating with said passages and corresponding to the openings in said evaporator means, conduit means interconnecting said corresponding openings so as to provide for a closed flow path for a refrigerant contained in said device, said condenser being formed of a thermally conductive material so that its passages and tubular and non-tubular sections dissipate heat received from said refrigerant when exposed to an area of lower ambient temperature.

13. Apparatus for spot cooling a number of vapor-type radiation devices simultaneously, said apparatus comprising a number of hollow evaporator means for absorbing heat from the surfaces of said devices, an at least partially hollow condenser having heat radiating surfaces, conduit members interconnecting the hollow portions of said evaporator means and said condenser, each of said conduit members having a single opening at its condenser end and a number of openings at its other end so as to form a flow path between said condenser and each of said evaporator means, and refrigerating means contained within said apparatus for transferring the heat absorbed by said evaporator means to said condenser when the latter is located in an area of lower ambient temperature than that of said devices.

14. Apparatus for spot cooling a number of vapor-type radiation devices simultaneously, said apparatus comprising a number of hollow evaporator means for absorbing heat from the surface of said devices, each of said evaporator means including openings at different levels thereof, a condenser having receptacles at different levels thereof, said receptacles being interconnected by thermal conducting hollow members, radiator means supported by said members for dissipating heat therefrom when exposed to an area of lower ambient temperature, conduit members interconnecting the hollow portions of said evaporator means to said condenser at the different levels thereof, each of said conduit members having a single opening at its condenser end and a number of openings at its other end so as to form a flow path between said condenser and each of said evaporator means, and refrigerating means contained within said apparatus for transferring the heat absorbed by said evaporator means to said condenser for dissipation thereby.

15. A lighting fixture housing having outer wall members at least partially therearound, a lamp having an elongated envelope and located within said housing, a hollow evaporator means attached to said lamp for absorbing heat from a part of the envelope thereof, said evaporator means including openings at different levels thereof, at least one of said wall members having a plurality of interconnected tubular sections formed therein, said wall member including openings in said wall members' surface communicating with said tubular sections and corresponding to the openings in said evaporator means, conduit members interconnecting said corresponding openings so as to provide for a closed flow path for a refrigerant contained therewithin, said wall member being formed of a thermally conductive material so that both its tubular and non-tubular sections dissipate heat received from said refrigerant when located in an area of lower ambient temperature.

16. A device for spot cooling a vapor-type lamp having an elongated envelope, said device comprising an evaporator having a substantially hollow interior, thermally conductive lamp contacting means secured to said evaporator for removing heat from a part of said envelope, said evaporator having upper and lower openings communicating with the hollow interior thereof, tubular elements each having one end thereof engaged with a respective one of said evaporator openings, a heat dissipating condenser having a generally hollow interior, said condenser having upper and lower openings communicating with the hollow interior thereof, the other end of each of said tubular elements engaged with a respective one of said condenser openings, said evaporator and condenser together with the connecting tubular elements forming a sealed flow path within said device, and a refrigerating means contained in said flow path for conducting heat from said evaporator to said condenser for the dissipation thereof so that the part of said envelope engaged by said contacting means will be relatively cooler than the operating temperature of the rest of said envelope.

17. A lighting fixture housing having outer wall members at least partially therearound, a lamp having an elongated envelope and located within said housing, hollow evaporator means having a generally C-shaped cross-sectional configuration which generally conforms to at least a part of the cross-sectional configuration of said lamp, resilient heat-conducting means located on the inner surface of said evaporator means releasably engaging said lamp, conduit members interconnecting the hollow portions of said evaporator means and said condensers, each of said conduit members having a single opening at its condenser end and a number of openings at its other end so as to form a flow path between said condenser and each of said evaporator means, and refrigerating means contained within said apparatus for transferring the heat absorbed by said evaporator means to said condenser when the latter is located in an area of lower ambient temperature than that of said evaporator.

References Cited in the file of this patent
UNITED STATES PATENTS

| | | |
|---|---|---|
| 2,453,433 | Hansen | Nov. 9, 1948 |
| 2,935,549 | Woods | May 3, 1960 |

Notice of Adverse Decision in Interference

In Interference No. 94,811 involving Patent No. 3,035,419, J. W. Wigert, COOLING DEVICE, final judgment adverse to the patentee was rendered June 22, 1966, as to claims 2 and 4.

[*Official Gazette August 9, 1966.*]